INVENTORS
LEWIS R. HETZLER
LEONARD J. SHELDRAKE
BY
John T. Martin
THEIR ATTORNEY

INVENTORS
LEWIS R. HETZLER
LEONARD J. SHELDRAKE
BY
THEIR ATTORNEY

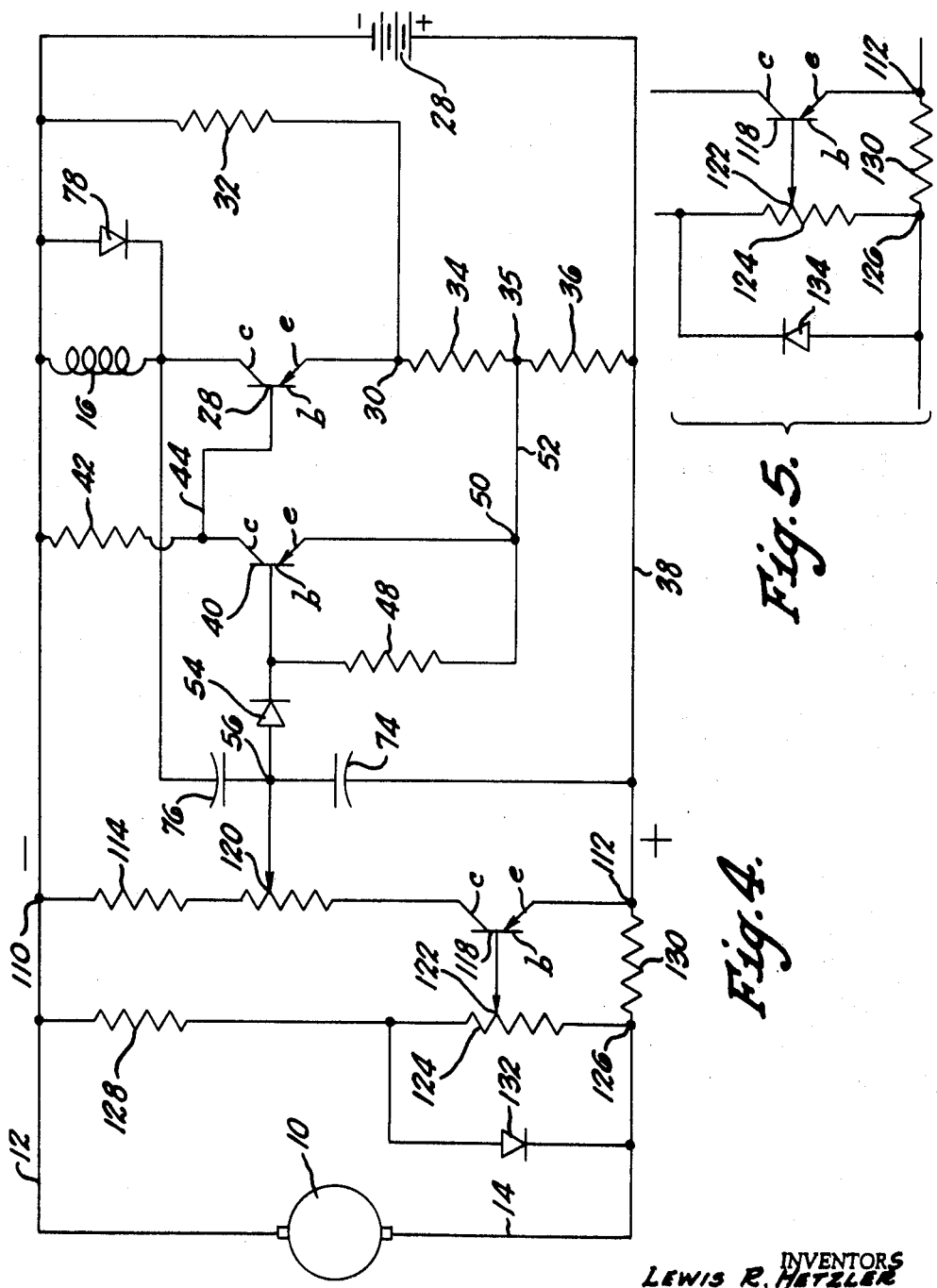

United States Patent Office 3,022,455
Patented Feb. 20, 1962

3,022,455
REGULATOR CIRCUIT FOR GENERATORS
Lewis R. Hetzler and Leonard J. Sheldrake, Anderson, Ind., assignors to General Motors Corporation, Detroit, Mich., a corporation of Delaware
Filed Feb. 21, 1958, Ser. No. 716,765
11 Claims. (Cl. 322—25)

This invention relates to a voltage and current-regulating circuit for a power source wherein the output of the power source is controlled by controlling the current flow through a control winding.

Although the regulating circuit has general application, it is particularly useful for controlling straight D.C. generators, straight A.C. generators with D.C. excitation and A.C. generators with a rectified output. The circuit has particular utility in motor vehicle installations where only a relatively-low value of voltage is available.

It is an object of this invention to provide a regulating circuit for a power source wherein a transistor is connected with the control winding of the power source in such a fashion that the conduction of the transistor controls the current flow through the control winding, and wherein the conduction of the transistor is controlled both as a function of the output voltage and current of the power source.

Another object of this invention is to provide a regulating circuit for a power source wherein a transistor is connected with the control winding of the power source and wherein a circuit arrangement is provided for rendering the transistor substantially either fully conductive or fully nonconductive to control the current flow in said control winding, the conduction of said transistor being controlled both as a function of the output voltage and current of the power source.

Still another object of this invention is to provide a regulating circuit for a power source wherein a transistor is connected with the control winding of the power source in such a fashion that the conduction of the transistor controls the current flow through the control winding, the circuit including means for producing a control voltage that varies in magnitude as a function of both the output voltage and current of the power source and wherein this control voltage is used to control the conduction of the transistor.

A further object of this invention is to provide a regulating circuit for a power source that is connected with a direct-current output circuit and wherein a transistor is connected with the control winding of the power source and with the output circuit for controlling the energization of the control winding, the conduction of the transistor being controlled in response to the voltage appearing across at least a portion of a voltage divider network, and wherein the impedance or resistance of the voltage divider network is varied in accordance with current flow in said D.C. output circuit.

Further objects and advantages of the present invention will be apparent from the following description, reference being had to the accompanying drawings wherein preferred embodiment of the present invention is clearly shown.

In the drawings:

FIG. 4 is a circuit diagram of a current and voltage-regulating circuit that is similar to the circuit shown in FIG. 3 and which employs a constant-voltage device to improve the regulating action.

FIG. 5 is a circuit diagram of a circuit that may replace a portion of the circuit shown in FIG. 4 to improve the regulating action of the regulator circuit.

Figure 1:
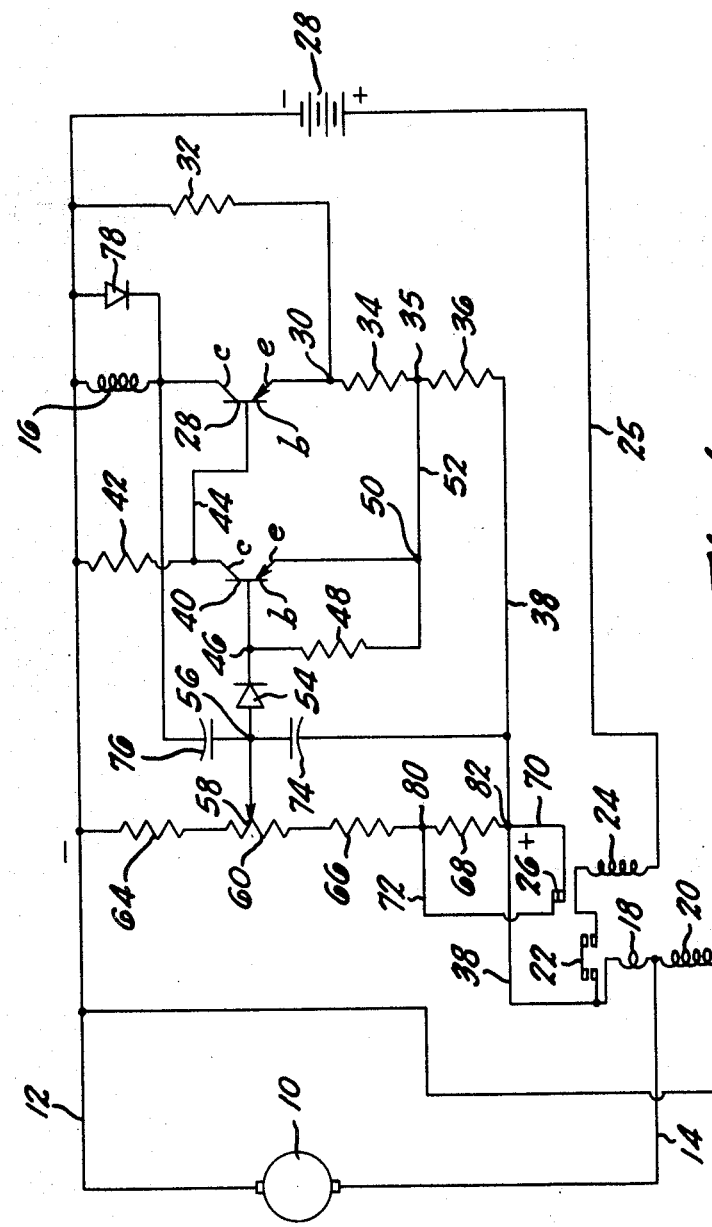
FIG. 1 is a circuit diagram of a current and voltage-regulating circuit made in accordance with this invention and employing a current relay for changing the voltage sensed by the regulator circuit.

Referring now more particularly to FIG. 1, a power source 10 is shown connected with a pair of direct-current output leads 12 and 14. The power source has a control winding 16 that varies the voltage output of the power source in accordance with current flow through winding 16. In this case the power source 10 is the armature of a D.C. generator and the control winding 16 is the shunt field of the generator. It will be apparent to those skilled in the art that the power source might take other forms, and could be an A.C. generator having D.C. excitation, or an A.C. generator having a rectified output. Where rectifiers are used, the D.C. output terminals of the rectifiers are connected with leads 12 and 14. The armature 10 of the D.C. generator is preferably connected with the engine of a motor vehicle (not shown) and if an A.C. generator is used, the rotor of the generator is connected to be driven by the engine of the motor vehicle.

The lead 14 is connected with the current coil 18 and the voltage coil 20 of a conventional cutout relay having a switch 22. One side of the voltage coil 20 is connected to lead 12. When the coils 18 and 20 are properly energized, the switch 22 is pulled to a closed position by magnetic attraction as is well known to those skilled in the art. When the coils 18 and 20 are de-energized, the contacts 22 are held in an open position by a spring (not shown).

One side of cutout relay switch 22 is connected with one side of the actuating coil 24 of a conventional electromagnetic vibratory-type of current relay that includes a switch 26. The switch 26 is normally held closed by a spring (not shown). When a predetermined amount of current flows through coil 24 the switch 26 is opened and closed at a rapid rate in a manner well known to those skilled in the art. The opposite side of current relay coil 24 is connected with a lead 25 that forms one lead of a charging circuit for a storage battery 28 that is connected between leads 12 and 25. The relay coil 24 is thus connected in series with the charging circuit for the battery and will be energized with load current from power source 10. Other D.C. loads (not shown) may be connected with leads 12 and 25 to be energized thereby.

The regulating circuit for control of field winding 16 includes a transistor 28 having an emitter electrode $e$, a base electrode $b$ and a collector electrode $c$. The collector of transistor 28 is connected to one side of control winding 16. The emitter of transistor 28 is connected with a junction 30 that is, in turn, connected to one side of resistors 32 and 34. The opposite side of resistor 32 is connected directly to lead 12 while the opposite side of resistor 34 is connected to a junction 35. A resistor 36 has one of its sides connected with junction 35 and has its opposite side connected with a lead 38.

The regulating circuit employs a driver transistor 40 having an emitter $e$, a base $b$ and a collector $c$. The collector $c$ of transistor 40 is connected to one side of a resistor 42 and with base $b$ of transistor 28 by a lead 44. The base $b$ of transistor 40 is connected to a junction 46 that is, in turn, connected to one side of a resistor 48. The emitter $e$ of transistor 40 is connected with a junction 50. The junctions 35 and 50 are connected together and to one side of resistor 48 by a lead 52.

The conduction of transistors 28 and 40, as will be more fully described hereinafter, is controlled by a voltage-responsive means which takes the form of a Zener diode 54. The Zener diode, as is well known to those skilled in the art, has the characteristic of substantially preventing all current flow in a reverse direction when voltages are applied across the diode that are below a predetermined critical value. When a voltage is applied across the diode that is above the critical voltage, the diode breaks down in the reverse direction and becomes a very low resistance. In the forward direction of current flow, the diode has a very low resistance.

One side of diode 54 is connected with terminal 46 while the other side of the diode is connected with terminal 56. The terminal 56 is connected to a movable tap 58 on a resistor 60. The tap point may be shifted along the length of the resistor to change the amount of resistance tapped off and constitutes a voltage adjustment for the regulating circuit.

The resistor 60 forms a portion of a voltage divider circuit that is connected between leads 12 and 38 and which includes resistors 64, 66 and 68. The potential of lead 38 is substantially the same as that of leads 14 and 25 when cutout relay switch 22 is closed so that the potential appearing across leads 12 and 38 is substantially identical with the voltage appearing at the output terminals of armature 10. The resistor 68 has its opposite ends connected with leads 70 and 72 which are connected to the opposite sides of relay-operated switch 26. It thus can be seen that resistor 68 is short circuited when switch 26 is closed, and is in circuit with resistors 60, 64 and 66 when switch 26 is in an open position. The switch 26 is normally closed until a predetermined load current passes through coil 24 whereupon the switch opens.

A condenser 74 is connected between junction 56 and lead 38. A second condenser 76 has one side connected with junction 56 and has its opposite side connected to one side of a rectifier 78. The condenser 74 operates as a filter to smooth some of the ripple which appears on the D.C. voltage and which affects the point of voltage regulation. The capacitor 76 is used to provide a feedback signal when a change in current in control winding 16 begins to occur. The rectifier 78 is used to assist in suppressing the voltage transient which will occur when the control winding current is moving toward zero value.

The operation of the regulating circuit shown in FIG. 1 will now be described. The voltage output of power source 10 is controlled by varying the current flow through control winding 16 and this is accomplished by varying the emitter-to-collector current or conduction of transistor 28. The transistor 28, as will become more readily apparent hereinafter, is rendered either substantially fully conductive or substantially fully nonconductive to control the current flow in control winding 16.

The conduction of transistor 28 is controlled by the conduction of transistor 40 which operates to shunt current away or around transistor 28. When current is permitted to flow between the emitter and base of transistor 40, a large current flows between the emitter and collector of the transistor due to the fact that the collector current of a transistor is a function of base current. With collector current flowing in transistor 40, it acts as a current shunt to shunt current away from transistor 28 and thus reduce the base current of transistor 28 essentially to zero. The reduction of base current in transistor 28 renders this transistor substantially nonconductive and thus reduces the current in field winding 16 substantially to zero.

When base current is not permitted to flow in transistor 40, the collector current of transistor 40 is reduced to substantially zero so that now the transistor no longer shunts current around or away from transistor 28. With base current flowing in transistor 28, the transistor is fully turned on to the point where it is substantially fully conductive from emitter to collector. This provides for substantially full field current in field winding 16 to increase the output voltage of armature 10.

The base current of transistor 40 is regulated as a function of the voltage appearing between junctions 58 and 80 or between junctions 58 and 82, depending on whether or not switch 26 is closed, by a circuit that includes the Zener diode 54. This circuit includes a sensing loop that is consisted of resistor 66, the portion of resistor 60 below junction 58, the Zener diode 54, the base-to-emitter circuit of transistor 40 shunted by resistor 48, and the resistor 36. The voltage divider network consisting of resistors 60, 64 and 66 and is used to apply a voltage to the sensing loop which is of the order of the Zener or critical voltage of the diode when the regulated voltage appearing between leads 12 and 14 is at the predetermined desired level.

When the regulated voltage is low, the diode 54 prevents base current flow in transistor 40 and hence the shutting off of collector current in transistor 40 to render transistor 28 substantially fully conductive from emitter to collector. This increases current flow in control winding 16 with a consequent increase in output voltage of power source 10. When the regulated voltage is high, the voltage developed between junctions 58 and 80 is of a value to impress a voltage across Zener diode 54 that is sufficient to cause breakdown of the diode and thus permit base current flow therethrough from transistor 40. With base current flowing in transistor 40, it is turned on full to shunt current away from transistor 28. This reduces the base current in transistor 28 to a value to render the transistor 28 substantially nonconductive and thus decrease the output voltage of power source 10. It is important to note here that the resistance value of resistor 42 is chosen according to the transistor current transfer characteristics so that somewhat more than enough base current will flow to provide maximum field current governed by the resistance of the field when the transistor is fully conductive.

The resistors 34 and 36 are connected in the regulating circuit in a manner illustrated in FIG. 1 and are used to insure that the operation of transistor 28 will only be stable when it is operating either substantially fully conductive or substantially fully nonconductive. By operating the transistor in this fashion, the heat losses of the transistor are reduced to a minimum.

When transistor 40 is fully conductive and transistor 28 nonconductive, a voltage is developed across resistor 34 which will appear across the base and emitter of transistor 28 due to the fact that at this time the transistor 40 is substantially a short circuit from emitter to collector. This voltage is of such a polarity and magnitude as to prevent current flow between the emitter and base of transistor 28, thus insuring that the transistor 28 will remain turned off. The resistance values of resistors 32, 34 and 36 are selected to give the proper voltage drop across resistor 34 to maintain transistor 28 cut off when it is nonconducting.

The resistor 36 is connected into the voltage sensing loop, as hereinbefore described, in such a manner that the voltage drop across it subtracts from the sensed voltage appearing across junctions 58 and 80. Assuming now that the regulated voltage is high, diode 54 will permit sufficient control current to pass through base to emitter circuit of transistor 40 to render transistor 28 nonconducting. With the current through control winding 16 reduced to essentially zero, the voltage across resistor 36 becomes essentially zero and the regulated voltage starts to drop. The no-voltage condition across resistor 36 will hold the field current at essentially zero until the normal control action previously described causes the field current to start to increase. When the field current begins to increase, the voltage drop across the feedback resistor 36 will also start to increase. This voltage drop is connected into the voltage sensing loop in such a manner that it subtracts from the sensed voltage across terminals 58 and 80 giving an indication that the regulated voltage is dropping faster than it actually is. This will call for more field current and the process will continue until the field current cannot increase further due to the field resistance.

Assuming that the generator capacity is adequate, the regulated voltage will start to rise with full field current. When the regulated voltage has increased to a point where the sensed voltage between junctions 58 and 80 less the feedback voltage across resistor 36 results in the proper control current through Zener diode 54, the field current in field 16 will begin to be reduced. The action is now reversed in that the voltage across resistor 36 will drop so that less voltage is subtracted from the sensed voltage, which appears between terminals 58 and 80, resulting in further lowering the field current and so on until the field current is driven to zero. The action of switching the field current on and off is extremely fast and hence no appreciable time is spent in the one-half current range of the transistor where it would heat.

As has been noted hereinbefore, the switch 26 is normally closed to short out resistor 68 when the load current is below a predetermined value. When no current regulation is required, the voltage appearing across junctions 58 and 80 is used as the control voltage for controlling the breakdown of Zener diode 54. During this time voltage regulation is taking place in response to the voltage drop appearing across junctions or terminals 58 and 80.

When the load current passing through coil 24 and lead 25 exceeds a predetermined amount, so that current regulation is needed, the switch 26 is opened to place resistor 68 in the voltage divider network. The control voltage for operating the regulator and for determining the conduction of Zener diode 54 is now developed between terminals 58 and 82. It can be seen that a greater voltage drop will now be developed between terminals 58 and 82 than was previously developed between terminals 58 and 80 because of the added resistance of resistor 68. With this greater voltage being developed, the regulator senses an apparent increase in regulated voltage and the field current in field winding 16 will be reduced to lower the voltage output of armature 10. As the voltage output drops, the load current will also drop and at some point the current will fall below the predetermined value and the switch 26 will reclose allowing the voltage to rise once more. This process will continue as long as current regulation is required. When the load current is below the predetermined maximum value, the voltage-regulating part of the circuit performs all the control function.

Figure 2:
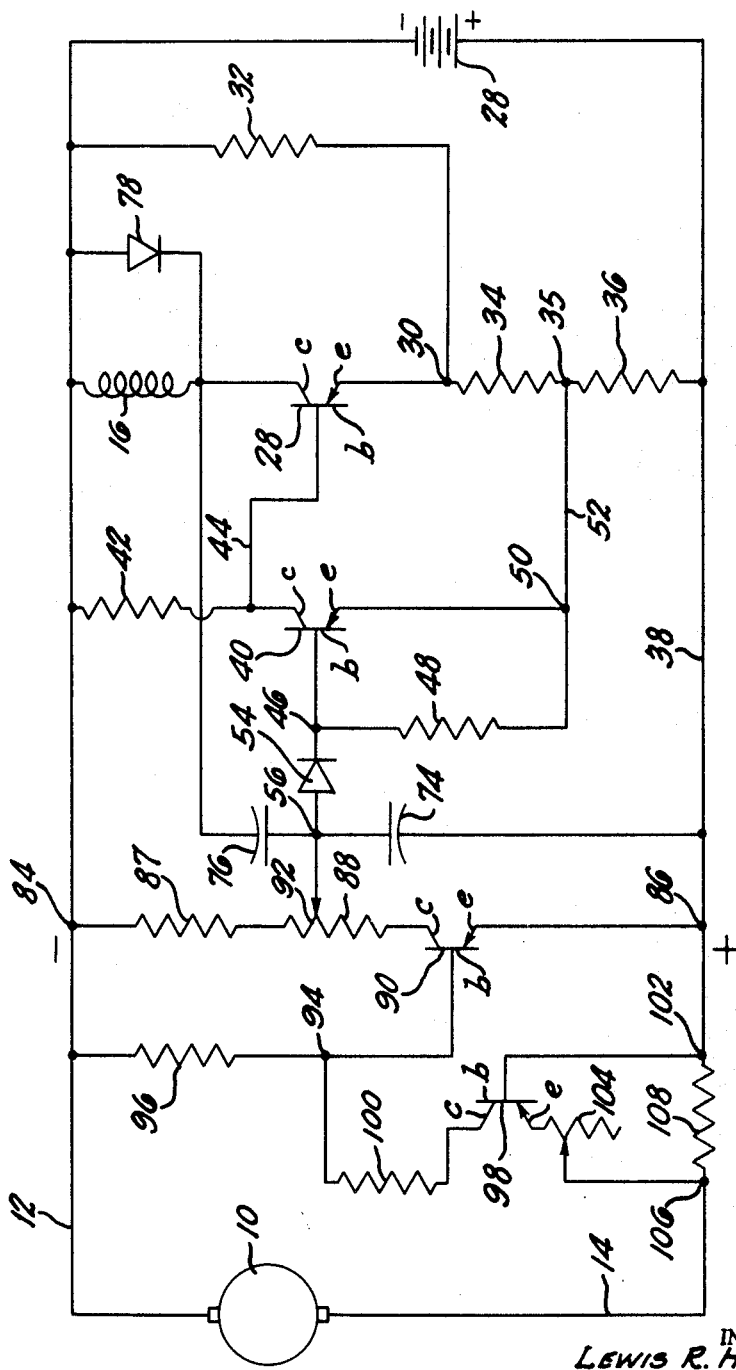
FIG. 2 is a circuit diagram of a current and voltage-regulating circuit made in accordance with this invention and employing a transistor for changing the voltage sensed by the regulator circuit.

Referring now to FIG. 2, a voltage and current-regulating circuit is shown that employs a transistor in the voltage divider portion of the circuit. The circuit to the right of terminals 84 and 86 in FIG. 2 is identical with the circuit to the right of the voltage divider network shown in FIG. 1 and like reference numerals in each figure have been used to identify identical parts. The cutout relay is not shown in FIG. 2 although it is apparent that one could be used with the circuit of FIG. 2 in a manner illustrated in FIG. 1. Where the power source 10 is an A.C. generator connected with a rectifier, no cutout relay is required as the rectifier will block reverse current flow when the generator is shut down. The operation of the circuit to the right of terminals 84 and 86 is the same as the operation of the circuit to the right of the voltage divider in FIG. 1 which has been previously described. The transistor 28 of FIG. 2 will thus be rendered either substantially fully conductive or substantially fully nonconductive in response to voltage applied across Zener diode 54 in a manner identical with the operation of FIG. 1.

The circuit for applying a voltage to Zener diode 54 in FIG. 2 takes a different form from that shown in FIG. 1. In FIG. 2, the voltage divider network between terminals or junctions 84 and 86 comprises resistors 87 and 88 and a transistor 90 having a collector $c$, a base $b$ and an emitter 3. A movable tap 92 or resistor 88 may be shifted to vary the resistance between tap 92 and terminal 86. The collector $c$ of transistor 90 is connected to one side of resistor 88 while the emitter is connected directly to terminal 86. The base $b$ of transistor 90 is connected with a junction 94 that is connected to one side of a resistor 96.

A transistor 98 has its collector electrode $c$ connected to one side of a resistor 100. The opposite side of resistor 100 is connected with junction 94. The base $b$ of transistor 98 is connected with a junction 102. The emitter $e$ of transistor 98 is connected to one side of a variable resistor 104. The shiftable tap of resistor 104 is connected with a junction 106. A resistor 108 is connected across junctions 106 and 102 and thus in series with the load circuit of power source 10.

The operation of the circuit shown in FIG. 2 will now be described. When the circuit of FIG. 2 is performing a voltage-regulating action, the Zener diode 54 responds to a control voltage that is developed between terminals 92 and 86. This voltage will be a part of the total voltage developed across terminals 84 and 86, and will be proportional to the resistance of the portion of resistor 88 below terminal 92 added to the resistance between emitter and collector of transistor 90. During voltage regulation, the transistor 90 is substantially fully conducting so that very little voltage is developed across it. The resistor 96 is selected to have a resistance value that gives a considerable excess of base current to insure that transistor 90 is fully conducting during voltage regulation. When the regulated voltage across terminals 84 and 86 is high, the voltage drop between terminals 86 and 92 is high enough to cause the breakdown of Zener diode 54 with a consequent cutoff of transistor 28. The voltage output of power source 10 is thus reduced by a reduction in current flow through control winding 16. When the regulated voltage is low, not enough voltage appears across terminals 86 and 92 to cause breakdown of Zener diode 54, and the current flow in control winding 16 is increased to increase the output voltage of power source 10.

The current-regulating action of the circuit of FIG. 2 is controlled by the voltage drop across resistor 108 which is connected in the load circuit of power source 10. When the current flow through resistor 108 exceeds a predetermined value, a voltage drop is developed thereacross which is of sufficient magnitude to put a forward bias on transistor 98 by rendering the emitter of transistor 98 highly positive with respect to its base. This causes a collector current to flow in transistor 98 from emitter to collector, thus reducing the voltage drop from emitter to collector of transistor 98. The forward bias, and thus the conduction from emitter to collector of transistor 90, depends upon the voltage developed across the emitter and collector of transistor 98 and with this voltage reduced, the conduction of transistor 90 is reduced. With the conduction of transistor 90 reduced, the transistor appears as a higher resistance from emitter to collector and thus more voltage is dropped between terminals 86 and 88. The regulating circuit senses this increased voltage drop and reduces the field current in field winding 16 to reduce the output voltage of armature 10 with a consequent reduction in output current. The voltage across resistor 108 is allowed to increase to some level without affecting the voltage regulator circuit, because the base of transistor 90 is biased sufficiently to give a considerable excess of base current. This requires a considerable change in the base voltage of transistor 90 before the voltage regulating sensing circuit is affected. Adjustment of the current regulating point is obtained through the variable resistor 104, the voltage developed across it subtracting from the voltage developed across resistor 108. The purpose of resistor 100 is to introduce a positive feedback which sharpens up the regulating point of the circuit.

Figure 3:
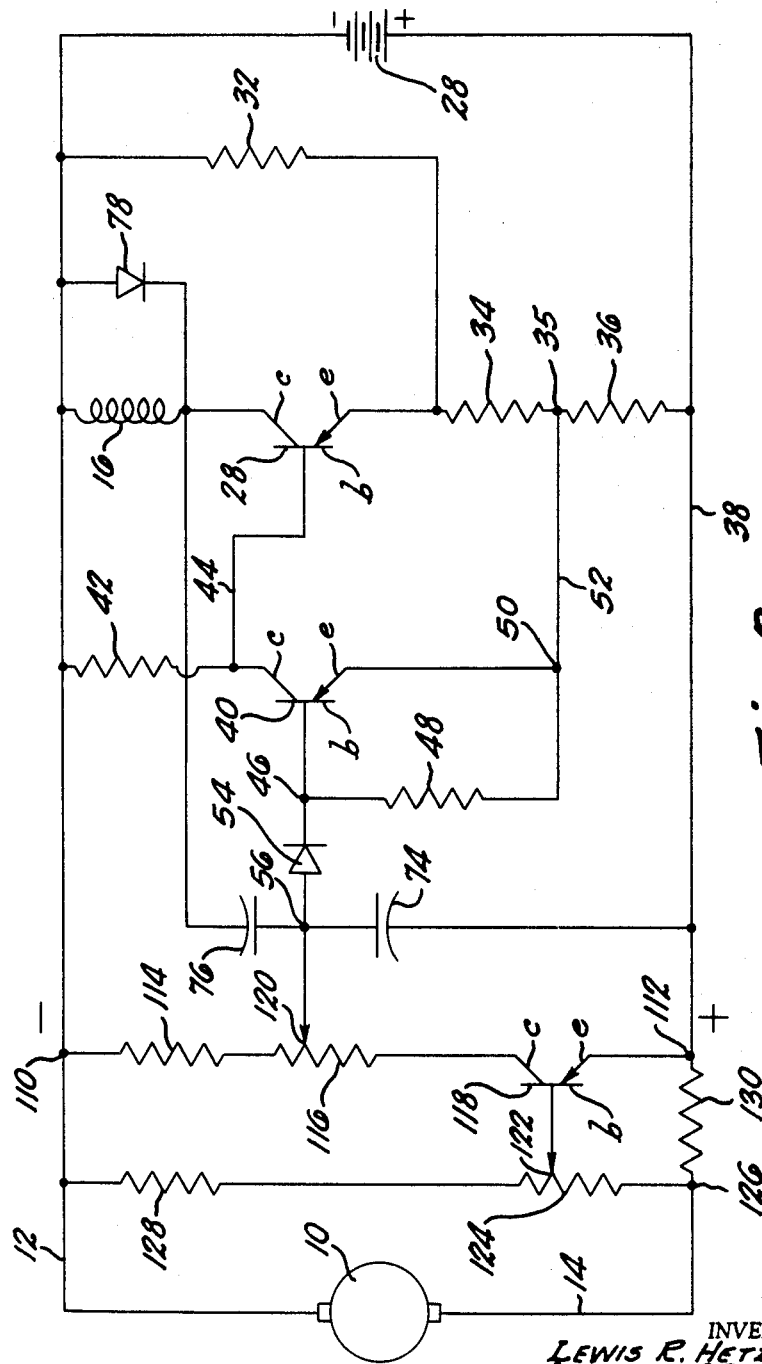
FIG. 3 is a circuit diagram of a current and voltage-regulating circuit made in accordance with this invention and employing a transistor for varying the voltage sensed by the regulator circuit.

Referring now to FIG. 3, a voltage and current regulating circuit is shown that employs a transistor in the voltage divider portion of the circuit. The circuit to the right of terminals 110 and 112 in FIG. 3 is identical with the circuit to the right of terminals 84 and 86 in FIG. 2 and is identical with the circuit to the right of the voltage divider in FIG. 1. The same reference numerals in all three figures have been used to identify identical parts in each figure. The operation of the circuit to the right of terminals 110 and 112 has been described hereinbefore, and hence this description is not repeated.

In FIG. 3 the voltage divider that develops the control voltage for Zener diode 54 is comprised of resistors 114 and 116 and transistor 118. The resistor 116 has a movable tap 120 that is connected to one side of Zener diode 54. The resistance between terminals 120 and 112 may be adjusted by shifting tap 120 and this sets the regulating point for the voltage regulating portion of the circuit. The collector $c$ of transistor 118 is connected to one side of resistor 116 while the emitter of the transistor is connected to terminal 112. The base $b$ of transistor 118 is connected to tap point 112 on resistor 124. One side of resistor 124 is connected to terminal 126 while the other side is connected to one side of resistor 128. The opposite side of resistor 128 is connected to lead 12. A resistor 130 is connected between terminals 112 and 126.

The circuit shown in FIG. 3 operates to regulate the voltage output of armature 10 in response to the voltage appearing between terminals 112 and 120. During voltage regulation, and when current regulation is not required, the voltage developed across the portion of resistor 124 below tap point 122 is used to apply a forward bias on transistor 118 so that transistor 118 conducts from emitter to collector. With transistor 118 conducting, there is little voltage drop across it from emitter to collector so that the voltage appearing between tap point 120 and terminal 112 is primarily that dropped across the portion of resistor 116 below tap point 120. When the voltage across terminals 110 and 112 is above the predetermined regulated value, the voltage between terminals 112 and 120 is high enough to cause breakdown of diode 54 with a consequent reduction in field current through field 16. When the regulated voltage is low, the voltage appearing across terminals 112 and 120 is not sufficient to cause breakdown of diode 54 and thus the current flow in field 16 is increased and the voltage output of armature 10 increased.

When the load current through resistor 130 increases to a point where current regulation is required, a voltage of a predetermined value is developed across resistor 130. This voltage will subtract from the reference voltage which is provided across the portion of resistor 124 below tap point 122, resulting in a reduction of base current in transistor 118. The resistor 128 is selected to have a value that provides an excess of emitter-to-base current in transistor 118 over that required for it to pass the emitter-to-collector current permitted by the resistance of resistors 114 and 120, and thus the initial reduction of base current, due to an increase of current through resistor 130, will not change the apparent resistance between emitter and collector of transistor 118. As a result, no change in the voltage drop between terminals 112 and 120 occurs. At some predetermined value of current flow through resistor 130, however, the emitter-to-base current through transistor 118 will drop below the minimum required and its resistance between emitter and collector will begin to increase. This is the point where current regulation will commence. When the emitter-collector resistance of transistor 118 begins to increase, the voltage regulator sensing voltage divider, 114, 120 and 118, is altered so that more voltage appears between terminals 112 and 120, and the field current in field 16 is reduced to decrease the output voltage of armature 10.

With the reduction in output voltage, the maximum load current can be maintained at the required level.

The circuit shown in FIG. 3 operates very well when a battery is connected across the load circuit of armature 10 tending to hold up the regulated voltage. Without a battery, the drop in regulated voltage, caused by current regulation, drops the reference voltage across the portion of resistor 124 below tap point 122, hence tending to cause more voltage reduction by the current-regulating action, and the current regulation will tend to cut back below the point where current regulation is first instituted. This is not serious when the voltage is somewhat stabilized by the presence of a battery on the line.

This tendency of the circuit of FIG. 3 to cut back current when no battery is on the line is eliminated when the circuit shown in FIG. 4 is used. The circuit of FIG. 4 is identical with FIG. 3 with the exception that a Zener diode 132 is connected across resistor 124. The same reference numerals have been used in FIGS. 3 and 4 to identify identical parts. The Zener diode, when a voltage is applied thereacross that exceeds its breakdown voltage, exhibits little or no change in voltage drop when the current flow therethrough is varied. Because of this constant voltage characteristic, the connection of the diode across resistor 124 stabilizes the voltage across resistor 124. This maintains the voltage across resistor 124 constant even when the current regulator reduces the output voltage to limit current and thus eliminates the tendency to cut back the current when no battery is on the line.

The same object will be accomplished if the Zener diode 132 is replaced by a silicon junction diode. This arrangement is shown in FIG. 5 which illustrates a portion of the circuit shown in FIG. 4 and wherein the silicon diode 134 is connected across resistor 124. The circuit of FIG. 5 is an alternative method of stabilizing the voltage across resistor 124. The silicon diode has a constant voltage drop thereacross with varying current flow therethrough in a forward direction. The diode thus operates as a constant voltage device in the same manner as the operation of Zener diode 132 in FIG. 4.

In summary, it can be seen that the voltage and current-regulating circuits of FIGS. 1 through 5 operate to control the output of a power source in response to a control voltage that is developed across a voltage divider network. The magnitude of this control voltage is a function of output voltage and output current and operates on a single sensing device to control the control winding current of the power source.

While the embodiments of the present invention as herein disclosed constitute a preferred form, it is to be understood that other forms might be adopted.

What is claimed is as follows:

1. In a combined voltage and current regulating circuit, a combination comprising, a power source having a control winding, a direct current output circuit including first and second leads energized by said power source, a first transistor, means connecting said first transistor and control winding in series across said two leads, a voltage divider network connected across said two leads and including a first resistor and a second transistor having a base, collector and emitter electrodes, said emitter and collector electrodes of said second transistor being connected in series with said first resistor with said emitter electrode being connected with said first lead, a single voltage responsive means connected to be responsive to the voltage appearing across at least a portion of said voltage divider network and connected in circuit with said first transistor for controlling the conduction of said first transistor, a second resistor having one side thereof connected with said first lead, and having its opposite side connected with said second lead, a third resistor connected in series with said first lead and having one side thereof connected with one side of said second resistor and having its opposite side connected with the emitter electrode of said second transistor, means connecting the base of said second transistor with said second resistor at a point where at least a portion of said resistor is connected between said first lead and said second transistor base electrode, a constant voltage drop circuit element, and means connecting said circuit element across said second resistor.

2. In a combined voltage and current regulating circuit, a combination comprising, a power source having a control winding, a direct current output circuit including first and second leads energized by said power source, a first transistor, means connecting said first transistor and control winding in series across said two leads, a voltage divider network connected across said two leads and including a first resistor and a second transistor having base, collector and emitter electrodes, said emitter and collector electrodes of said second transistor being connected in series with said first resistor with said emitter electrode being connected with said first lead, a single voltage responsive means connected to be responsive to the voltage appearing across at least a portion of said voltage divider network and connected in circuit with said first transistor for controlling the conduction of said first transistor, a second resistor having one side thereof connected with said first lead, and having its opposite side connected with said second lead, a third resistor connected in series with said first lead and having one side thereof connected with one side of said second resistor and having its opposite side connected with the emitter electrode of said second transistor, means connecting the base of said second transistor with said second resistor at a point where at least a portion of said second resistor is connected between said first lead and said second transistor base electrode, a Zener diode, and means connecting said Zener diode across said second resistor in such a direction as to provide a constant voltage across said second resistor.

3. In a combined voltage and current regulating circuit, a combination comprising, a power source having a control winding, a direct current output circuit including first and second leads energized by said power source, a first transistor, means connecting said first transistor and control winding in series across said two leads, a voltage divider network connected across said two leads and including a resistor and a second transistor having base, collector and emitter electrodes, said emitter and collector electrodes of said second transistor being connected in series with said resistor with said emitter electrode being connected with said first lead, a single voltage responsive means connected to be responsive to the voltage appearing across at least a portion of said voltage divider network and connected in circuit with said first transistor for controlling the conduction of said first transistor, a second resistor having one side thereof connected with said first lead and having its opposite side connected with said second lead, a third resistor connected in series with said first lead and having one side thereof connected with one side of said second resistor and having its opposite side connected with the emitter electrode of said second transistor, means connecting the base of said second transistor with said second resistor at a point where at least a portion of said second resistor is connected between said first lead and second transistor base electrode, a silicon junction diode, and means connecting said diode across said second resistor in such a direction as to provide a substantially constant voltage across said second resistor.

4. In a combined voltage and current regulating circuit, a combination comprising, a source of direct current power having a control winding, an output circuit energized by said source of power, a first semi-conductor having a pair of current carrying electrodes and a control electrode, means connecting the current carrying electrodes of said semi-conductor in series with said control winding and across said output circuit, voltage developing means connected across said output circuit for developing a voltage in accordance with changes in voltage appearing across said output circuit, voltage responsive means connected between said voltage developing means and the control electrode of said semi-conductor for controlling the conduction of said semi-conductor between its current carrying electrodes, a voltage developing circuit element connected in series with said semi-conductor, means connecting said voltage developing circuit element with said voltage repsonsive means and with said voltage developing means, and means for varying the conduction of said semi-conductor in response to current flow through one of the leads of said output circuit.

5. In a combined voltage and current regulating circuit, a combination comprising, a power source having a control winding, a two-lead direct current output circuit energized by said power source, a semi-conductor having a pair of current carrying electrodes and a control electrode, means connecting the current carrying electrodes of said semi-conductor in series with said control winding and across said two-lead direct current output circuit, a voltage developing circuit connected across said two-lead output circuit, a voltage responsive circuit element connected between said voltage developing circuit and the control electrode of said semi-conductor for controlling the conduction of said semi-conductor between its current carrying terminals, a circuit element adapted to develop a voltage upon current flow therethrough connected in series with one of the current carrying terminals of said semi-conductor, means connecting said circuit element with at least a portion of said voltage developing circuit and with said voltage responsive circuit element, and means for controlling the conduction of said semi-conductor between its current carrying terminal in response to current flow in said two-lead output circuit.

6. In a combined voltage and current regulating circuit, a combination comprising, a power source having a control winding, a direct current output circuit energized by said power source, a transistor having emitter, collector and base electrodes, a first current path connected across said direct current output circuit including said control winding, the emitter to collector circuit of said transistor, and a voltage developing circuit element, a voltage divider network connected across said direct current output circuit including a resistor and the emitter to collector circuit of a second transistor, voltage responsive means connected between said voltage divider network and the base electrode of said first transistor for controlling its conduction, means for varying the conduction of said second transistor between its emitter and collector in accordance with current flow through said direct current output circuit, and means connecting said voltage developing circuit element with said voltage responsive means and with said voltage divider network.

7. In a combined voltage and current regulating circuit, the combination comprising, a power source having a control winding, a direct current output circuit energized by said power source, a three terminal semi-conductor including a pair of current carrying terminals and a control terminal, means connecting the control terminals of said semi-conductor and said control winding in series and across said output circuit, a voltage divider network connected across said output circuit, means for varying the impedance of said voltage dividing network in accordance with current flow through said direct current output circuit, voltage responsive means connected with said voltage divider network and with the control terminal of said semi-conductor for controlling its conduction, means connected in series with one of the current carrying terminals of said semi-conductor for developing a control voltage, and means for applying said control voltage to said voltage responsive circuit, and to said voltage divider network.

8. In a combined voltage and current regulating circuit, the combination comprising, a power source having a control winding, a direct current output circuit energized by said power source, a first transistor having emitter, collector and base electrodes, means connecting the emitter to collector circuit of said first transistor and said control winding in series and across said output circuit, a voltage dividing network connected across said output circuit, said voltage dividing network including a resistor and emitter to collector circuit of a second transistor, means connected with said second transistor for controlling its conduction from emitter to collector in accordance with current flow in said output circuit, a voltage responsive diode connected with said voltage dividing network and with the base electrode of said first transistor for controlling the conduction of said first transistor from emitter to collector in accordance with the voltage developed across said voltage divider network, and a resistor connected in series with the emitter electrode of said first transistor, said resistor being connected with said voltage responsive diode and with said voltage divider network.

9. In a combined voltage and current regulating circuit, the combination comprising, a powder source having a control winding, a direct current output circuit energized by said power source, a first transistor having emitter, collector and base electrodes, a first current path connected across said output circuit including said control winding, the emitter to collector circuit of said transistor, and first and second voltage developing circuit elements having a common junction, a second transistor having emitter, collector and base electrodes, means connecting the emitter electrode of said second transistor with the common junction of said first and second voltage developing circuit elements, means connecting the collector electrode of said second transistor with the base electrode of said first transistor and to one side of said direct current output circuit, a voltage divider network connected across said output circuit including a third transistor, means for controlling the conduction of said third transistor in accordance with current flow in said output circuit, and a voltage responsive circuit element connecting the base electrode of said second transistor with said voltage divider network.

10. In a combined voltage and current regulating circuit, the combination comprising, a power source having a control winding, a direct current output circuit energized by said power source, a transistor having emitter, collector and base electrodes, means connecting said control winding and the emitter to collector circuit of said transistor across said output circuit, a voltage divider network connected across said output circuit including the emitter to collector circuit of a second transistor, means connecting the base electrode of said first transistor with said voltage dividing network, a resistor connected across said output circuit, means connecting the base electrode of said second transistor with said resistor, said resistor forming a part of a circuit for controlling the voltage applied to the emitter and base electrode of said second transistor for controlling its conduction from emitter to collector in accordance with current flow through said output circuit, and a constant voltage device connected across said resistor.

11. In a combined voltage and current regulating circuit, the combination comprising, a powder source having a control winding, a direct current output circuit energized by said power source, a first transistor having emitter, collector and base electrodes, a first current path connected across said output circuit including said control winding, the emitter to collector circuit of said first transistor, and first and second voltage developing circuit elements having a common junction, a bypass circuit connecting the junction of the emitter electrode of said first transistor and one of said voltage developing circuit elements with one side of said direct current output circuit, a second transistor having emitter, collector and base electrodes, means connecting the emitter electrode of said transistor to the junction of said first and second voltage developing circuit elements, means connecting the collector electrode of said second transistor with the base electrode of said first transistor and to one side of said direct current output circuit, a voltage divider network connected across said output circuit, said dividing network including a third transistor, means for controlling the conduction of said transistor in accordance with current flow through said output circuit, and voltage responsive means connected between said voltage divider network and the base electrode of said second transistor.

References Cited in the file of this patent

UNITED STATES PATENTS

| | | |
|---|---|---|
| 2,809,301 | Short | Oct. 8, 1957 |
| 2,862,175 | Guyton et al. | Nov. 25, 1958 |
| 2,892,143 | Sommer | June 23, 1959 |
| 2,912,635 | Moore | Nov. 10, 1959 |

Notice of Adverse Decision in Interference

In Interference No. 92,961 involving Patent No. 3,022,455, L. R. Hetzler and L. J. Sheldrake, REGULATOR CIRCUIT FOR GENERATORS, final judgment adverse to the patentees was rendered Mar. 10, 1966, as to claims 4, 5, 6 and 8.

[*Official Gazette August 9, 1966.*]